(12) United States Patent
Rahimi et al.

(10) Patent No.: US 9,305,458 B2
(45) Date of Patent: Apr. 5, 2016

(54) PROXIMITY-DETECTION SYSTEMS AND METHODS

(71) Applicant: ZipSocket, Inc., San Mateo, CA (US)

(72) Inventors: Ali Rahimi, San Francisco, CA (US); Gianluca Iannaccone, Oakland, CA (US)

(73) Assignee: ZIPSOCKET, INC., San Mateo, CA (US)

( * ) Notice: Subject to any disclaimer, the term of this patent is extended or adjusted under 35 U.S.C. 154(b) by 93 days.

(21) Appl. No.: 14/321,589

(22) Filed: Jul. 1, 2014

(65) Prior Publication Data

US 2014/0313862 A1    Oct. 23, 2014

Related U.S. Application Data

(63) Continuation-in-part of application No. 13/776,460, filed on Feb. 25, 2013, now abandoned.

(60) Provisional application No. 61/603,243, filed on Feb. 25, 2012.

(51) Int. Cl.
*H04W 4/02* (2009.01)
*G08C 23/02* (2006.01)
*H04W 4/04* (2009.01)

(52) U.S. Cl.
CPC .......... *G08C 23/02* (2013.01); *H04W 4/02* (2013.01); *H04W 4/023* (2013.01); *H04W 4/025* (2013.01); *H04W 4/043* (2013.01)

(58) Field of Classification Search
CPC ....... H04W 4/02; H04W 4/023; H04W 4/025; H04W 4/043
See application file for complete search history.

(56) References Cited

U.S. PATENT DOCUMENTS

| | | | | |
|---|---|---|---|---|
| 7,171,329 | B2* | 1/2007 | Rodman | H04M 3/56 342/450 |
| 8,483,725 | B2* | 7/2013 | Kim | H04N 21/4394 455/456.6 |
| 9,143,571 | B2* | 9/2015 | Kim | H04L 67/18 |
| 9,148,742 | B1* | 9/2015 | Koulomzin | H04W 4/00 |
| 2009/0176505 | A1* | 7/2009 | Van Deventer | G06F 1/1626 455/456.1 |
| 2010/0112991 | A1* | 5/2010 | Hannaby | H04M 1/2155 455/414.3 |
| 2010/0332668 | A1* | 12/2010 | Shah | H04W 4/02 709/229 |
| 2012/0263020 | A1* | 10/2012 | Taylor | G01S 5/18 367/124 |
| 2013/0040572 | A1* | 2/2013 | Berrett | H04W 4/023 455/41.2 |

* cited by examiner

*Primary Examiner* — Andrew Bee
(74) *Attorney, Agent, or Firm* — AEON Law; Adam L. K. Philipp

(57) ABSTRACT

When two or more devices are near each other, they are likely to hear the same ambient sounds. To detect such proximity, each device captures a short digital audio signal from its microphone and uploads it to a proximity-detecting service along with a timestamp that indicates when the clip was captured. The proximity-detecting service maintains a history of sound clips for its clients and analyzes recently received sound clips that have similar time stamps. The devices can then be grouped according to the similarities of their sound clips. Devices that are grouped together in this way are deemed to be near each other.

21 Claims, 7 Drawing Sheets

PROXIMITY-DETECTION SYSTEMS AND METHODS

CROSS-REFERENCE TO RELATED APPLICATIONS

This application is a continuation-in-part of Non-provisional patent application Ser. No. 13/776,460; filed Feb. 25, 2013; titled DETECTING WHEN DEVICES ARE NEAR EACH OTHER BY MATCHING THEIR AMBIENT SIGNATURES; and naming inventors Ali RAHIMI et al. Non-provisional patent application Ser. No. 13/776,460 claims the benefit of priority to Provisional Patent Application No. 61/603,243; filed Feb. 25, 2012; titled DETECTING WHEN DEVICES ARE NEAR EACH OTHER BY MATCHING THEIR AMBIENT SIGNATURES; and naming inventors Ali RAHIMI et al. The above-cited applications are hereby incorporated by reference, in their entireties, for all purposes.

FIELD

This disclosure is directed to the field of software, and more particularly to determining that remote devices share an acoustic environment without the need for any of the remote devices to specifically emit an identifiable audio signal.

BACKGROUND

Computer devices (desktop computers, laptops, smartphones, tablets) rely on a variety of sensors and system to determine they location on the globe: GPS, triangulation of signal strengths from nearby WiFi access points or cell towers, DNS, or IP Geolocation. The granularity of these methods can be as fine as a few meters in the best case (GPS when outdoors with clear signals from many GPS satellites) or as coarse as an entire town (IP Geolocation). In some uses cases, such gross geolocation estimates with coarse granularity may be adequate, such as for navigating roads or for signaling one's presence in a building. However, such gross geolocation estimates are too coarse to detect when devices are within social proximity of each other: for example, in the same room, at arm's length, or across-the-table from each other.

Near-Field Communication (NFC) ostensibly addresses the coarse granularity of today's positioning systems. NFC allows two devices to detect when they near each other using a technology similar to RFID tag readers. For the interactions described above, NFC has two shortcomings: (1) it requires devices to be almost in contact with each other to be detected, and (2) it cannot detect when multiple devices are near each other.

DESCRIPTION

Figure 4:
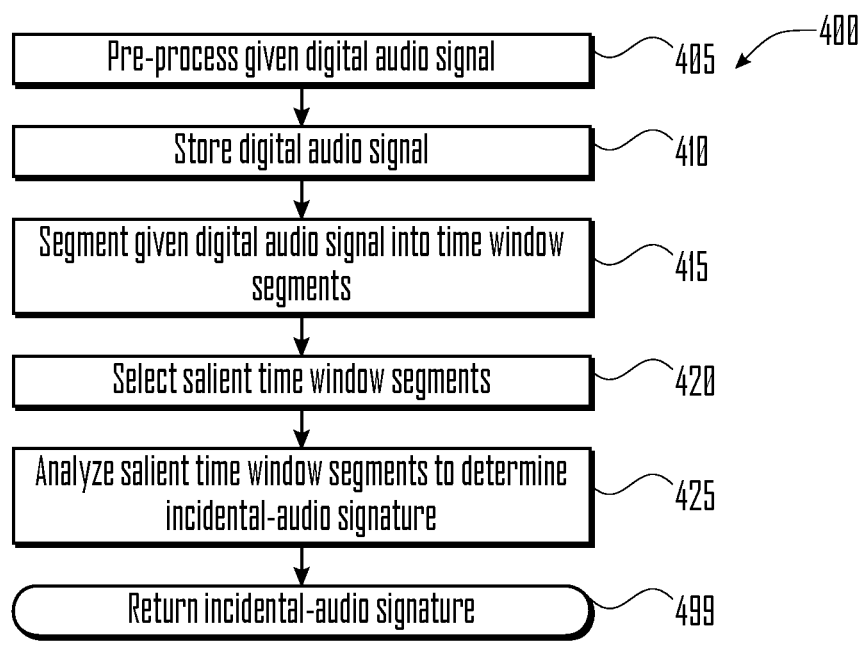
FIG. 4 illustrates an incidental-audio-signature subroutine for determining an incidental-audio signature based on a given digital audio signal, such as may be performed by a proximity-detecting server in accordance with one embodiment.

In a mobile setting, detecting social proximity obviates the need for selecting individuals or devices from a long list of contacts, or for broadcasting content via social network sites to a broader group of devices or people than intended. For example, In conferencing, users could seamlessly declare their intention to pool their devices into one virtual video conferencing device that consists of multiple phones or tablets, and place a single call out of this virtual device. Today, the participants would declare their intention to pool their devices by selecting each other from a contact list (FIG. 4).

Figure 1:
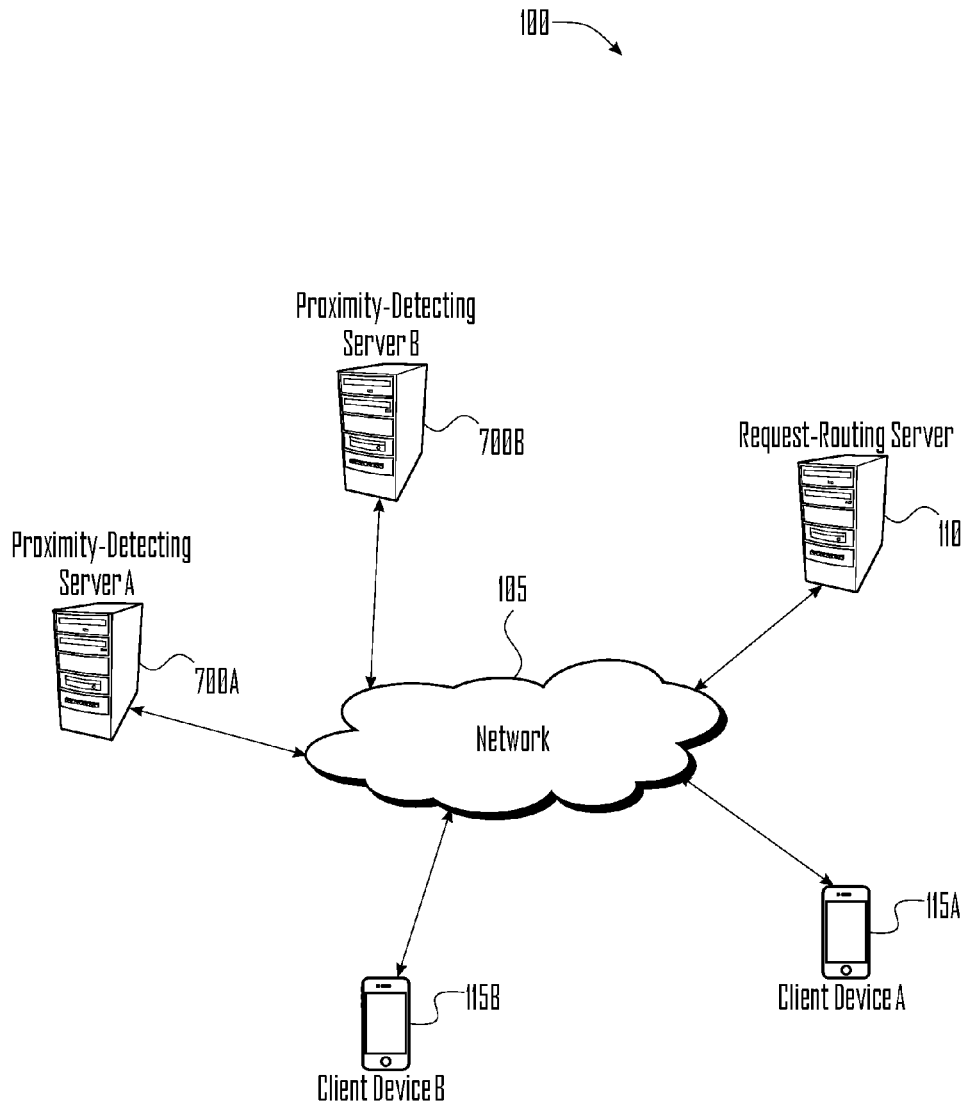
FIG. 1 illustrates a simplified proximity-detecting system in which proximity-detecting servers, request-routing server, and client devices are connected to network.

For sharing photos or links to multimedia content, such as YouTube videos, users can simply broadcast the information to a subset of people near them, instead of selecting them individually from a contact list or broadcasting much more broadly on social networking sites (FIG. 1).

A user can transfer money to another user or to a point of sale machine simply by confirming the transaction with a nearby recipient device. Today, this requires swiping the devices against each other (using radio technologies such as Near Field Communication) or typing the recipient's email address (using online services such as PayPal).

In mobile gaming, nearby users could seamlessly declare their intention to join each other in a video game. Today, this requires browsing through a list of players in a virtual game lobby.

There are many uses cases, particularly involving mobile devices and mobile applications, that could take advantage of proximity information. For example, in one embodiment, a device may present a list of nearby users to which content (e.g. a YouTube video) may be shared. The user selects the recipients of the content by swiping a finger over the pictures of the recipients.

In another embodiment, video tiles showing participants in a real-time conferencing application may be arranged according to their seating order in real life.

Existing positioning systems do not provide the granularity to support such interactions. But these interactions do not require fine-grained position. As described below, to support such interactions, devices need not know their exact position on the globe. Rather, devices need only detect when they are near each other. Proximity can be determined at much finer granularity than absolute location. For example, instead of mapping the SSID of nearby WiFi access points to an absolute coordinate via an atlas of SSID fingerprints acquired through wardriving then comparing the absolute coordinates from two devices to determine whether they are near each other, one can simply assess whether the devices observe similar SSID signatures.

More particularly, when two or more devices are near each other, they are more likely to hear the same ambient sounds. To detect such proximity, each device captures a short sound clip from its microphone (in an exemplary implementation, the clips are 2 seconds long), and uploads it to a proximity-detecting service along with a timestamp that indicates when the clip was captured. It is assumed that the clocks of the devices are synchronized to within a small factor of the duration of the sound clip. For example, when the sound clips are 2 seconds long, it is preferable that the clocks of the devices are synchronized to within about 500 ms. The proximity-detecting service maintains a history of sound clips for its clients and analyzes recently received sound clips that have similar time stamps. The devices can then be grouped according to the similarities of their sound clips. Devices that are grouped together in this way are deemed to be near each other.

The phrases "in one embodiment", "in various embodiments", "in some embodiments", and the like are used repeatedly. Such phrases do not necessarily refer to the same embodiment. The terms "comprising", "having", and "including" are synonymous, unless the context dictates otherwise.

As discussed herein, in various embodiments, a processor and/or processing device may be configured (e.g., via non-transitory computer-readable storage media) to perform a first method for determining that remote devices share an acoustic environment without the need for any of the remote devices to specifically emit an identifiable audio signal, the first method including steps similar to some or all of the following: obtaining the first digital audio signal representing the first incidental-ambient soundscape that is incidental to the first acoustic environment, as sampled during the first time period by the first remote device; analyzing the first digital audio signal to identify the identified portion of the first digital audio signal that includes the non-predetermined two or more salient frequency components across the first two or more time windows; determining, based at least in part on the non-predetermined two or more salient frequency components and the first two or more time windows, the incidental-audio signature specific to the first incidental-ambient soundscape and the first time period; obtaining the second digital audio signal representing the second incidental-ambient soundscape that is incidental to the second acoustic environment, as sampled during the second time period by the second remote device, wherein at least a portion of the second time period overlaps the first time period; identifying the temporal portion of the second digital audio signal that matches the incidental-audio signature more closely than other temporal portions of the second digital audio signal; determining the similarity measure comparing the temporal portion of the second digital audio signal with the incidental-audio signature; when the similarity measure exceeds a threshold, identifying the acoustic link between the first acoustic environment and the second acoustic environment; and consequently facilitating the first remote device and the second remote device to access a shared computing resource.

In some embodiments performing the first method, analyzing the first digital audio signal to identify the identified portion of the first digital audio signal comprises: segmenting the first digital audio signal into the two or more time-window segments; and selecting the subset of the two or more time-window segments as including two or more frequency components whose energies vary highly within the subset of the two or more time-window segments.

In some embodiments performing the first method, analyzing the first digital audio signal to identify the identified portion of the first digital audio signal comprises: segmenting the first digital audio signal into the two or more time-window segments; and selecting the subset of the two or more time-window segments as having amplitudes that vary highly within the subset of the two or more time-window segments.

In some embodiments performing the first method, analyzing the first digital audio signal to identify the identified portion of the first digital audio signal comprises: determining the background-noise frequency and/or amplitude characteristic of the first digital audio signal; and selecting the subset of the two or more time-window segments as differing from the background-noise frequency and/or amplitude characteristic.

In some embodiments performing the first method, analyzing the first digital audio signal to identify the identified portion of the first digital audio signal comprises filtering the first digital audio signal to enhance frequency components within the human-voice-perception frequency-band and/or to diminish frequency components outside the human-voice-perception frequency-band.

In some embodiments performing the first method, the first method further includes in response to obtaining the first digital audio signal and the second digital audio signal, respectively providing the server manifest to the first remote device and the second remote device, the server manifest identifying the two or more computers that provide proximity-detecting services, including the processor, and the respective two or more weighted geographic purviews of the two or more computers.

In some embodiments performing the first method, the first method further includes: determining two or more gross geolocation estimates corresponding respectively to two or more remote devices that are currently providing or have recently provided digital audio signals to the processor; determining two or more statistical measures based on the two or more gross geolocation estimates; and updating the server manifest based at least in part on the two or more statistical measures.

In some embodiments performing the first method, the first method further includes: determining a count of the two or more remote devices; reporting the count to a request-routing server; and receiving a re-weighted server manifest from the request-routing server.

In some embodiments performing the first method, the first method further includes: determining a count of the two or more remote devices; and when the count exceeds a predetermined threshold, activating a new instance of the processor.

Described more fully below are many additional details, variations, and embodiments that may or may not include some or all of the steps, features, and/or functionality described above.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 illustrates a simplified proximity-detecting system in which proximity-detecting servers 700A-B, request-routing server 110, and client devices 115A-B are connected to network 105.

One or more instances of proximity-detecting server 700 (see FIG. 7, discussed below) provide proximity-detecting services, such as described more fully below.

In various embodiments, network 105 may include the Internet, a local area network ("LAN"), a wide area network ("WAN"), and/or other data network. In addition to traditional data-networking protocols, in some embodiments, data may be communicated according to protocols and/or standards including near field communication ("NFC"), Bluetooth, power-line communication ("PLC"), and the like.

Request-routing server 110 represents one or more computing devices that is capable of connecting to network 105 and providing request-routing services, such as described herein.

More particularly, the proximity-detecting service does not a priori know good weighted geographic purviews for proximity-detecting servers 700A-B or their kin, so it dynamically adjusts their respective weighted geographic purviews to match the geographic distribution of the client devices they are currently handling. In one embodiment, request-routing server 110 maintains a server manifest and periodically recomputes the server manifest weights of the proximity-detecting servers 700A-B based on the number of clients each server is handling. In various embodiments, request-routing server 110 is logically only one server but could be implemented as a cluster of servers answering to the same IP address or DNS name running a distributed database to maintain the server manifest.

In one embodiment, The algorithm for updating the purview of a proximity-detecting server is an online version of the coordinate ascent algorithm for fitting a mixture of Gaussians to the GPS location of client devices. Each proximity-detecting server's purview is represented by a Gaussian distribution on GPS coordinates: the purview has a mean, a variance, and a weight. The weights across all the servers sum up to 1 and indicate the relative prominence of each purview. Each client selects a proximity-detecting server. In some embodiments, each server supports up to N clients, a system-wide configuration parameter. The model then involves three sets of variables: the assignment between clients and servers, represented as an indicator variable $c_{ik}=1$ when client i is assigned to server k, the mean and variances parameters $mu_k$ and $sigma_k$ of the purview of each server k; and the weight $alpha_k$ of each server k. The best setting for these variables is the one that maximizes the likelihood of the model:

$$\prod_i \sum_{k=1}^{K} c_{ik} \alpha_k \mathcal{N}(x_i \mid \mu_k, \sigma_k)$$

A batch coordinate ascent algorithm for maximizing these parameters might repeatedly executes theses steps:
1. (Assignment variables) Each client chooses a server to attach to, picking $c_{ik}$ for all k. This takes O(NK).
2. (Gaussian parameters) Each server updates its mean and variance to match the sample mean and variance of the clients attached to it. This takes O(N) in total, O(N/K) for each server.
3. (Weights) Each server communicates the number of clients attached to it to request-routing server 110.

Request-routing server 110 normalizes this information and obtains the weights. This takes O(K).

But in some cases, the devices change their geographic locations from time to time, and the GPS location of the devices may not available in batches. In such cases, an online version of the above algorithm may be employed. These steps operate independently of each other periodically:
1. A client i chooses the server k to attach to, setting $c_{ik}$ for all k. This takes O(K) for the client.
2. When a server receives a client's signature, it updates its mean and variance parameters $mu_k$ and $sigma_k$. If the server has more than N clients, it forks a copy of itself, activating a new instance with different means. This takes O(1) for the server.
3. Periodically, servers notify request-routing server 110 of the number of clients attached to them. Request-routing server 110 computes new weights alpha for the servers and broadcasts a new addressbook to these. This takes request-routing server 110 O(K).

These algorithms are not identical. In the batch algorithm, all clients first pick a server simultaneously. Then all servers update their parameters. In the online algorithm, clients pick a server when they compute their signature, and the server updates its parameters immediately. But with this scheme, we are able to scale our proximity detection service to an arbitrary number of devices.

Client devices 115A-B represent one or more computing devices that are capable of connecting to network 105 and communicating with proximity-detecting servers 700A-B and/or request-routing server 110, such as described herein.

In various embodiments, additional infrastructure (e.g., short message service centers, cell sites, routers, gateways, firewalls, and the like), as well as additional devices may be present. Further, in some embodiments, the functions described as being provided by some or all of proximity-detecting servers 700A-B and request-routing server 110 may be implemented via various combinations of physical and/or logical devices.

However, it is not necessary to show such infrastructure and implementation details in FIG. 1 in order to describe an illustrative embodiment.

Figure 2:
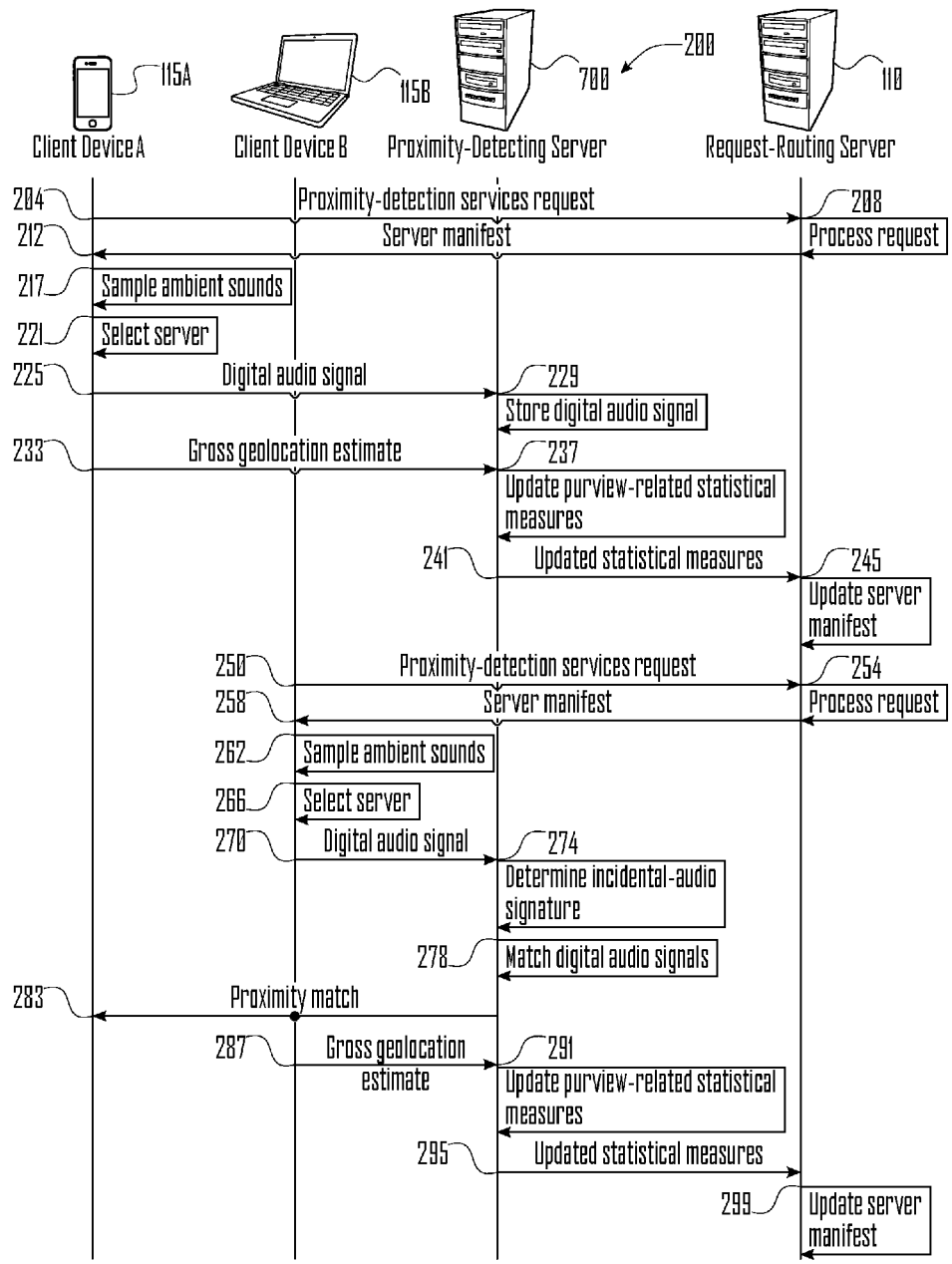
FIG. 2 illustrates an exemplary series of communications between client device, client device, proximity-detecting server, and request-routing server in accordance with one embodiment.

FIG. 2 illustrates an exemplary series of communications between client device 115A, client device 115B, proximity-detecting server 700, and request-routing server 110 in accordance with one embodiment. The communications shown in FIG. 2 do not encompass every combination of possibilities in which the systems and methods provided herein may be employed. Rather, the illustrated communications merely provide an overview of one simplified example scenario. Additional variations and alternatives are described more fully in the Figures and description that follow.

Beginning the illustrated sequence of communications, client device 115A sends a request 204 for proximity-detection services to request-routing server 110, which processes 208 the request and responds by sending server manifest 212 to client device 115A. Generally, the server manifest includes a list of proximity-detecting servers and their respective weighted geographic purviews. In various embodiments, the server manifest may include various statistical measures related to each server's weighted geographic purview, including statistical measures similar to some or all of the following: longitude, latitude, variance, weight.

Client device 115A samples 217 the incidental-ambient soundscape of its acoustic environment during the current time period (e.g., for a period of about 2 seconds), thereby capturing a digital audio signal. Client device 115A then determines a gross geolocation estimate (e.g., using GPS or a similar signal) and selects 221 a proximity-detecting server whose weighted geographic purview corresponds to the client's gross geolocation estimate.

For example, in one embodiment, denoting the client's longitude and latitude by lon and lat respectively, the appropriate server is the server l for which the following quantity is largest (where the dot notation l. longitude refers to the longitude of server l, and so on with the other fields):

$$\frac{-(lon - l.longitude)^2 + (lat - l.latitude)^2}{2 \times l.variance} + \log\left(\frac{l.weight}{l.variance}\right).$$

Client device 115A sends the captured digital audio signal 225 to proximity-detecting server 700. In various embodiments, the digital audio signal sent by client device 115A may comprise any suitable data that may be decompressed or otherwise processed to obtain a digital representation of the sampled acoustic environment surrounding client device 115A. In the simplified example scenario, this is the first digital audio signal that proximity-detecting server 700 has received, so it does not determine an incidental-audio signature and try to match it to other previously received digital audio signals. Rather, Proximity-detecting server 700 stores 229 the determined digital audio signal.

Client device 115A also sends to proximity-detecting server 700 its gross geolocation estimate 233, such as may be derived via GPS or a similar signal. This gross geolocation estimate is used to help determine proximity-detecting server 700's weighted geographic purview, and is not directly used to determine client device 115A's proximity to other devices.

Based at least in part on the gross geolocation estimate thereby received, proximity-detecting server 700 updates 237 one or more purview-related statistical measures. For example, in one embodiment, when proximity-detecting server 700 receives a digital audio signal from a client, it updates mean and variance parameters $\mu_k$ and $\sigma_k$. In some embodiments, if proximity-detecting server 700 has more than N clients, it forks a copy of itself, creating two identical servers with different means.

Periodically, proximity-detecting server 700 notifies request-routing server 110 of the count of clients attached to proximity-detecting server 700. To that end, proximity-detecting server 700 sends the updated statistical measures 241 to request-routing server 110, which uses the data to update 245 the server manifest that it maintains. For example, in one embodiment, request-routing server 110 computes new weights $\alpha$ for proximity-detecting server 700 (and its siblings) and makes an updated server manifest available.

Client device 115B sends a request 250 for proximity-detection services to request-routing server 110, which processes 254 the request and responds by sending server manifest 258 to client device 115B.

Client device 115B samples 262 the incidental-ambient soundscape of its acoustic environment during the current time period (e.g., for a period of about 2 seconds), thereby capturing a digital audio signal. Client device 115B then determines a gross geolocation estimate (e.g., using GPS or a similar signal) and selects 266 a proximity-detecting server whose weighted geographic purview corresponds to the client's gross geolocation estimate.

Client device 115B sends the captured digital audio signal 270 to proximity-detecting server 700. In various embodiments, the digital audio signal sent by client device 115B may comprise any suitable data that may be decompressed or otherwise processed to obtain a digital representation of the sampled acoustic environment surrounding client device 115B.

Proximity-detecting server 700 determines 274 an incidental-audio signature based at least in part on the digital audio signal, and matches 278 the incidental-audio signature to one or more previously stored digital audio signals. In the illustrated example scenario, the incidental-audio signature is determined to match the previously received digital audio signal from client device 115A.

Generally, to quantify the similarity between two digital audio signals, an incidental-audio signature is determined based on salient segments in one signal. The other digital audio signal is searched to identify segments that correspond to the incidental-audio signature. The quality of these correspondences measures the similarity between the two digital audio signals.

Formally, let $a_0(t)$ and $a_1(t)$ denote the two digital audio signals, with samples indexed by time t. Denote their spectrograms by $S_0(t,f)$ and $S_1(t,f)$, where f is the frequency index.

Next, identify salient temporal segments in $S_0$, denoting the center of these by intervals centered at monotonically increasing time indices $t_0 = t_0^1, \ldots, t_0^n$ and widths $w_0 = w^1, \ldots, w^n$. In one embodiment, $S_0$ is segmented with evenly spaced intervals. In other embodiments, $S_0$ may be segmented adaptively by selecting segments with high variation in signal amplitude and energy, or choosing segments that exhibits a shift from the baseline signal or the background noise.

Segments in $S_1$ are searched to identify those that correspond to the segments in $S_0$. For each interval $[t_0^i, t_0^i + w^i]$ of $S_0$, intervals $[t, t+w^i]$ in $S_1$ may be scanned exhaustively for every t in $S_1$. The resulting similarity between these segments is denoted by $V(i, t)$.

Time indices $t^1, \ldots, t^n$ are identified in $S_1$ that best match the segments $t_0^1, \ldots, t_n^n$ in $S_0$ by solving the following optimization problem:

$$\operatorname*{minimize}_{t_1 < \ldots < t^n} \sum_i V(i, t_i)$$

The resulting indices are constrained to be monotonically increasing to ensure the correspondences do not cross over each other. In one embodiment, to solve this optimization problem, a suitable dynamic programming procedure may be employed. The value of this optimization problem is the similarity between $a_0$ and $a_1$.

In other embodiments, this optimization procedure may be solved by considering $V(i, t)$ to be the number of votes region i casts for time shift $\delta = t_0 - t$. Then select the time shift $\delta^*$ that receives the most votes. The similarity between $a_0$ and $a_1$ is then the root mean square difference between $a_0$ and $a_1$ shifted by $\delta^*$.

In typical scenarios, the proximity-detecting service must carry out the above similarity computation between many pairs of devices. It is possible to amortize the cost of these comparisons by combining them into one operation.

For each stored digital audio signal, segment its spectrogram into intervals as described above, and store these segments in a data structure that allows similar segments to be quickly identified. For example, data structures that serve this purpose include the K-Means tree, a ball tree, a hash table, or the like. When a new digital audio signal arrives, it is segmented and its segments are stored into the data structure one by one. In addition, whenever a segment of the new digital audio signal matches that of a previous digital audio signal in the data structure, increment the similarity between the corresponding digital audio signal and the new digital audio signal. After storing every segment of a new digital audio signal into the data structure, its similarity with previous stored clips can simply be read off from these counts.

The cost of processing a new digital audio signal in this way is proportional to the number of segments it contains, multiplied by the time it takes to search for these in the data structure, which is typically logarithmic in the number of segments stored in the data structure.

Once similarity measurements have been taken, a clustering algorithm may be used to identify groups of devices that are in physical proximity or otherwise in linked acoustic environments. The similarities between the digital audio signals from n devices may be represented as an n×n matrix S. The ijth entry of S is the similarity between the digital audio signals from device i and device j. A clustering algorithm partitions the integers 1 . . . n into subsets that are mutually similar within a partition and dissimilar across partitions. Instead of specifying the number of partitions a priori, the clustering algorithm is provided with a sensitivity parameter for the tightness of the clusters it is to produce, which allows the algorithm to choose the number of clusters automatically.

In one embodiment, a clustering algorithm similar to the follow may be employed: a similarity threshold τ is specified, and a graph is built over n nodes where an edge between nodes i and j exists whenever $S_{ij} > \tau$. The transitive closure of this graph is a partitioning of the nodes. In this partitioning, the similarity between nodes in the same partition exceeds τ and the similarity between nodes across partitions falls below τ.

In the illustrated example, proximity-detecting server 700 determines that client device 115A and client device 115B fall into the same cluster. Consequently, proximity-detecting server 700 sends to client device 115A and client device 115B a message indicating a proximity match 283 between the respective devices to facilitate client device 115A and client device 115B to access a shared computing resource (e.g., a real-time communication session, presentation materials, a multi-player game, or the like).

Client device 115B also sends to proximity-detecting server 700 its gross geolocation estimate 287, such as may be derived via GPS or a similar signal. This gross geolocation estimate is used to help determine proximity-detecting server 700's weighted geographic purview, and is not directly used to determine client device 115B's proximity to other devices.

Based at least in part on the gross geolocation estimate thereby received, proximity-detecting server 700 updates 291 one or more purview-related statistical measures.

Periodically, proximity-detecting server 700 notifies request-routing server 110 of the count of clients attached to proximity-detecting server 700. To that end, proximity-detecting server 700 sends the updated statistical measures 295 to request-routing server 110, which uses the data to update 299 the server manifest that it maintains. For example, in one embodiment, request-routing server 110 computes new weights α for proximity-detecting server 700 (and its siblings) and makes an updated server manifest available.

Figure 3:
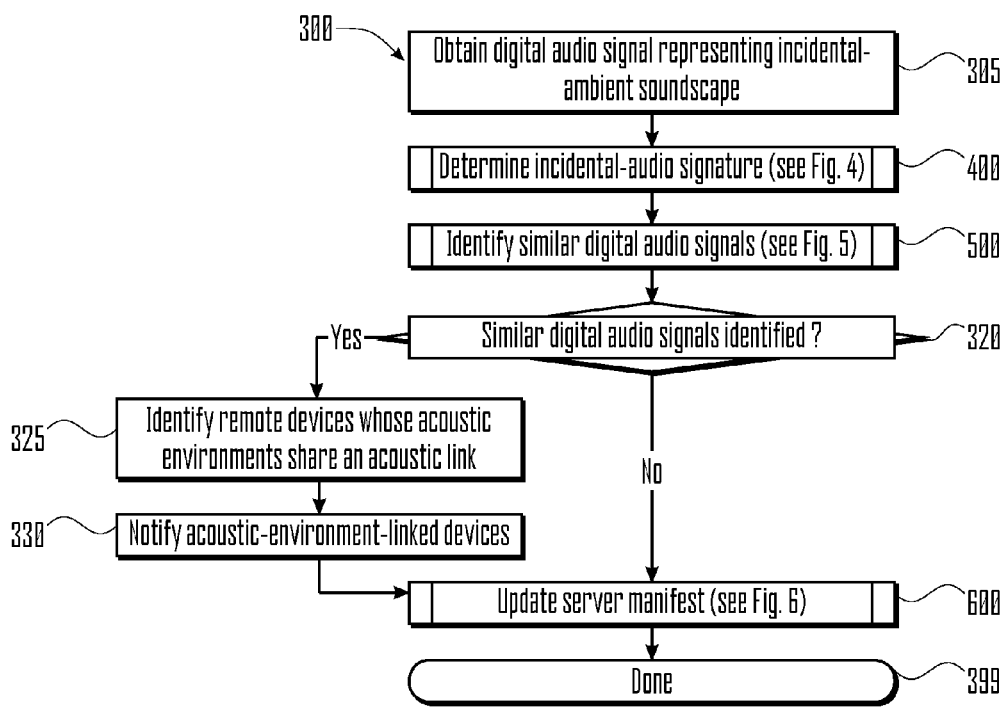
FIG. 3 illustrates a proximity-detecting routine for determining that remote devices share an acoustic environment without the need for any of the remote devices to specifically emit an identifiable audio signal, such as may be performed by a proximity-detecting server in accordance with one embodiment.

FIG. 3 illustrates a proximity-detecting routine 300 for determining that remote devices share an acoustic environment without the need for any of the remote devices to specifically emit an identifiable audio signal, such as may be performed by a proximity-detecting server 700 in accordance with one embodiment.

In block 305, proximity-detecting routine 300 obtains a digital audio signal representing an incidental-ambient soundscape that is incidental to an acoustic environment in which a remote device is located, the digital audio signal having been sampled during a time period by the remote device. Generally, the digital audio signal is received from the remote device after the remote device selects the server performing proximity-detecting routine 300 (e.g., proximity-detecting server 700) based on the gross geolocation estimates of clients served by the server as indicated in a server manifest provided by request-routing server.

In various embodiments, the acoustic environment includes various sounds that are incidental to the proximity-detecting services discussed herein. In other words, no remote device emits a sound specifically for purposes of being identified and/or located according to the systems and methods described herein.

In some embodiments, while it is sampling the acoustic environment, the remote device may also be emitting incidental sounds into the acoustic environment. For example, when the remote device is a mobile phone, and its operator is having a phone call or similar audio conference, the remote device may be emitting sounds for purposes of furthering the audio conference. In some cases (e.g., when the mobile phone is acting as a 'speaker phone') those sounds may propagate into the acoustic environment and become part of the digital audio signal that is sampled by the remote device. However, the presence of such incidental remote-device-emitted sounds is not required.

Relatedly, in some cases, the first operator of the first device may be holding an audio conference with a second operator who is operating a second device from a location that is not physically proximate to the first operator and/or the first device. In such cases, sounds from the first acoustic environment surrounding the first device may be broadcast into the second acoustic environment surrounding the second device, and/or vice versa. In some embodiments, the first acoustic environment may be considered to be linked to the second acoustic environment by virtue of the partially shared incidental-ambient soundscapes.

In subroutine block 400, proximity-detecting routine 300 calls subroutine 400 (see FIG. 4, discussed below) to determine an incidental-audio signature specific to the incidental-ambient soundscape and the time period represented by the digital audio signal obtained in block 305.

In subroutine block 500, proximity-detecting routine 300 calls subroutine 500 (see FIG. 5, discussed below) to identify zero or more digital audio signals that are similar to the incidental-audio signature determined in subroutine block 400.

In decision block 320, proximity-detecting routine 300 determines whether one or more similar digital audio signals were identified in subroutine block 500. If so, proximity-detecting routine 300 proceeds to block 325; otherwise, proximity-detecting routine 300 proceeds to server-manifest subroutine 600.

In block 325, proximity-detecting routine 300 identifies two or more remote devices whose acoustic environments share an acoustic link based at least in part on the similar digital audio signals identified in decision block 320. For example, in one embodiment, a clustering approach similar to that discussed above in respect to FIG. 2 may be employed.

In block 330, proximity-detecting routine 300 notifies the two or more devices that sampled the similar digital audio signals that an acoustic link exists between their respective acoustic environments to facilitate their accessing a shared computing resource.

In subroutine block 600, proximity-detecting routine 300 calls subroutine 600 (see FIG. 6, discussed below) to update a server manifest used by remote devices to select a proximity-detecting server based on weighted geographic purviews.

Proximity-detecting routine 300 ends in ending block 399.

FIG. 4 illustrates an incidental-audio-signature subroutine 400 for determining an incidental-audio signature based on a given digital audio signal, such as may be performed by a proximity-detecting server 700 in accordance with one embodiment.

In many embodiments, the given digital audio signal will be 1-3 seconds long, although shorter or longer durations may be employed in other embodiments. For example, in embodiments that are tailored to identifying acoustic environments that are linked by an electronic telephonic and/or telecommunications channel (e.g., when an individual is attending a meeting remotely via speaker phone or similar telecommunications technology), the given digital audio signal may be longer, e.g. 2-5 seconds, to allow for delay and/or latency introduced by the telecommunications channel. In some embodiments, durations shorter than 500 ms may be associated with less-accurate proximity detections.

In some embodiments, in block 405, incidental-audio-signature subroutine 400 optionally pre-processes the given digital audio signal. For example, in one embodiment, incidental-audio-signature subroutine 400 may apply one or more high-pass, low-pass, band-pass, or similar filters to enhance frequency components with a frequency-range of interest and/or to diminish frequency components outside a frequency-range of interest. In some embodiments, the given digital audio signal may be filtered to enhance/diminish frequency components inside/outside a human-voice-perception frequency-band (e.g., approximately 300-3000 Hz).

In other embodiments, incidental-audio-signature subroutine 400 may perform other operations on the given digital audio signal, such as squaring the amplitude of each sample to increase the contrast between loud and soft signals.

In block 410, incidental-audio-signature subroutine 400 stores (e.g. in proximity-detecting database 740) the digital audio signal in association with the remote device and a timestamp indicating when the digital audio signal was recorded.

In block 415, incidental-audio-signature subroutine 400 segments the given digital audio signal into several time window segments.

For example, in one embodiment, incidental-audio-signature subroutine 400 may segment the given digital audio signal into time windows having individual durations of between approximately 10 ms-100 ms. The duration of each time window may be selected to balance accuracy (shorter time windows) versus computation efficiency (longer time windows).

Experimental observations suggest that time-window durations around 100 ms may provide a reasonable balance for digital audio signals with a duration of about 2 seconds. Generally, it may be desirable to segment the given digital audio signal into at least 7-8 time window segments.

In block 420, incidental-audio signature-subroutine 400 does not have a predetermined target to search for within the given digital audio signal. Rather, incidental-audio-signature subroutine 400 must analyze the time window segments to select those having strong and/or distinct frequency components. In one embodiment, such salient time window segments may be selected using techniques similar to those discussed above in respect to FIG. 2.

In block 425, incidental-audio-signature subroutine 400 analyzes the salient time window segments determined in block 420 to determine an incidental-audio signature specific to the incidental-ambient soundscape and the time period represented by the given digital audio signal. Generally, such an incidental-audio signature comprises data representing one or more salient frequency components of the salient time window segments determined in block 420.

Incidental-audio-signature subroutine 400 ends in ending block 499, returning to the caller.

Figure 5:
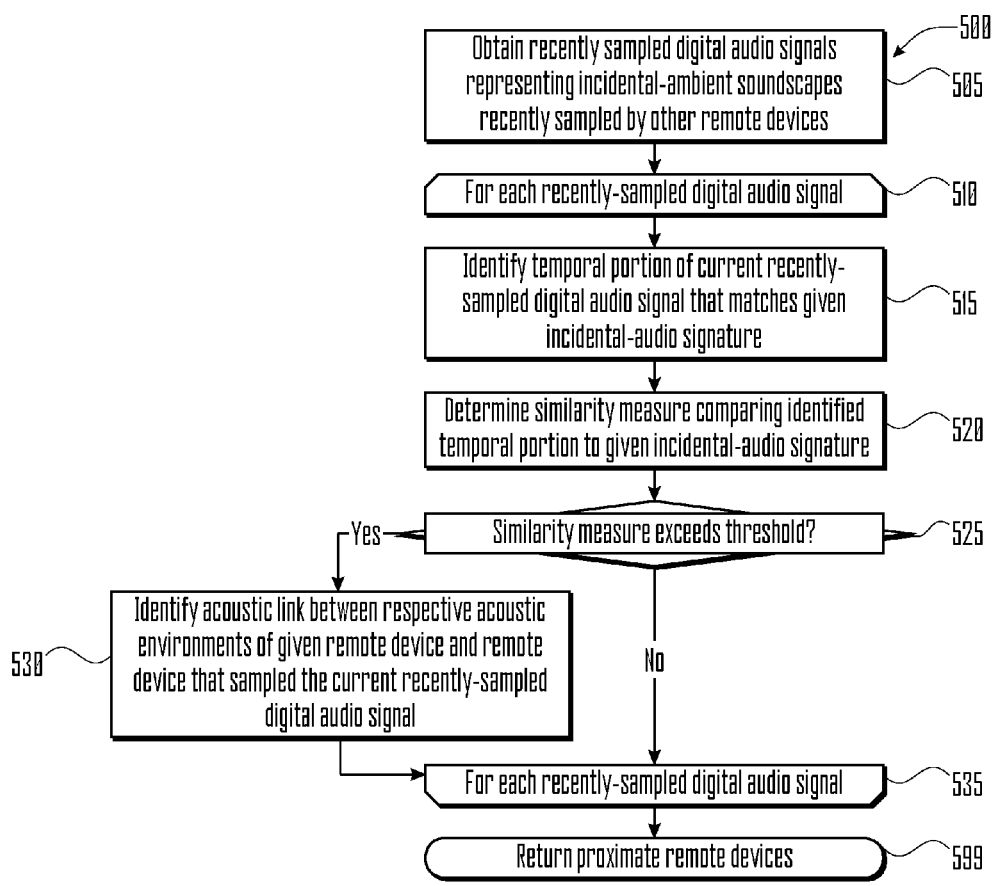
FIG. 5 illustrates a signature-match subroutine for matching a given incidental-audio signature of a digital audio signal sampled by a given remote device to other recently obtained digital audio signals, such as may be performed by a proximity-detecting server in accordance with one embodiment.

FIG. 5 illustrates a signature-match subroutine 500 for matching a given incidental-audio signature of a digital audio signal sampled by a given remote device to other recently obtained digital audio signals, such as may be performed by a proximity-detecting server 700 in accordance with one embodiment.

In block 505, signature-match subroutine 500 obtains, e.g. by querying DB, one or more digital audio signals representing incidental-ambient soundscapes that were recently sampled by one or more other remote devices in one or more other acoustic environments. As discussed elsewhere, in various embodiments the recently sampled digital audio signals may have individual durations of between about 500-5000 ms.

Beginning in opening loop block 510, signature-match subroutine 500 processes each recently-sampled digital audio signal in turn.

In block 515, signature-match subroutine 500 identifies a temporal portion of current recently-sampled digital audio signal that matches the given incidental-audio signature more closely than other temporal portions. For example, in one embodiment, signature-match subroutine 500 may employ techniques similar to those discussed above in relation to the match 278 operation (see FIG. 2).

In block 520, signature-match subroutine 500 determines a similarity measure comparing the identified temporal portion to the given incidental-audio signature. For example, in one embodiment, signature-match subroutine 500 may employ techniques similar to those discussed above in relation to the match 278 operation (see FIG. 2).

In decision block 525, signature-match subroutine 500 determines whether the similarity measure determined in block 520 exceeds a predetermined threshold. If so, signature-match subroutine 500 proceeds to block 530; otherwise, signature-match subroutine 500 proceeds to ending loop block 535. For example, when making this determination in one embodiment, signature-match subroutine 500 may employ clustering techniques similar to those discussed above in relation to the proximity match 283 message (see FIG. 2).

In block 530, signature-match subroutine 500 identifies an acoustic link between the respective acoustic environments of the given remote device and the remote device that sampled the current recently-sampled digital audio signal. In various embodiments, an acoustic link may indicate that two or more remote devices are in physical proximity (e.g., at the same conference table, in the same room, or the like) and/or are acoustically linked via an electronic telephonic and/or telecommunications channel (e.g., when an individual is attending a meeting remotely via speaker phone or similar telecommunications technology).

In ending loop block 535, signature-match subroutine 500 iterates back to opening loop block 510 to process the next recently-sampled digital audio signal, if any. Once all digital audio signals have been processed, signature-match subroutine 500 ends in ending block 599, returning a data structure indicating a cluster of remote devices (if any) that are in a linked acoustic environment.

Figure 6:
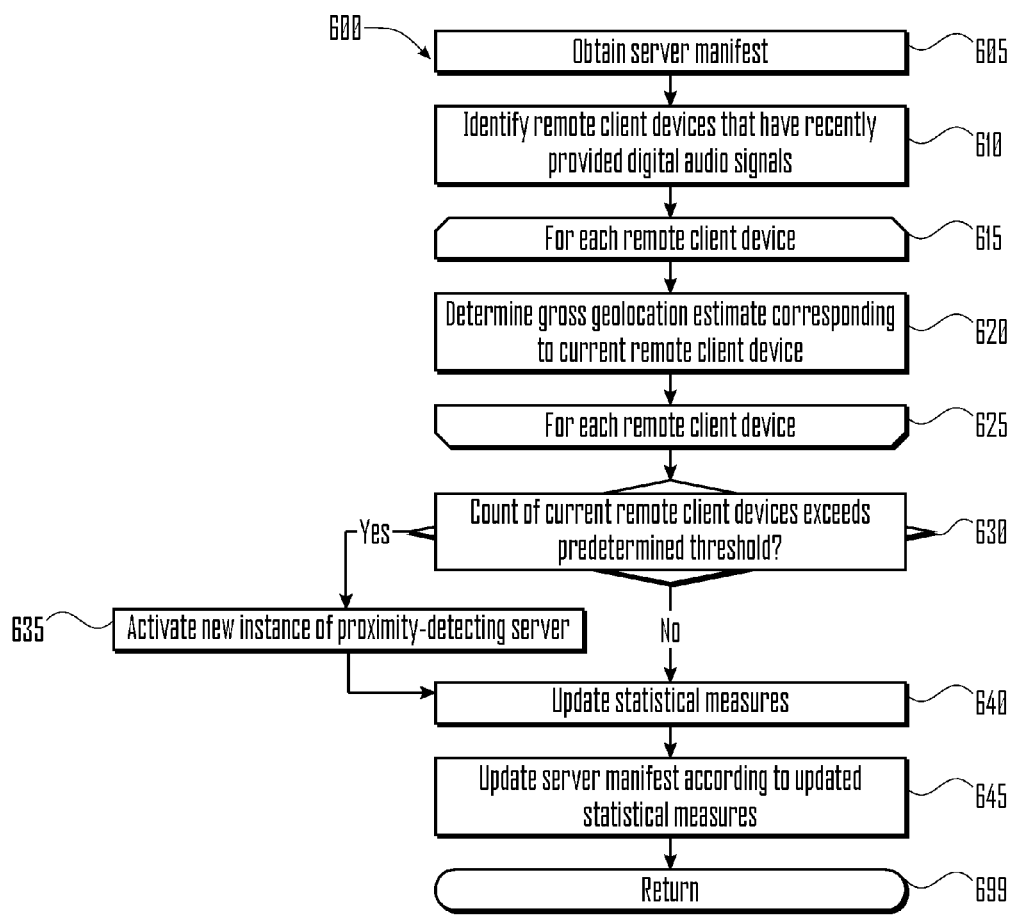
FIG. 6 illustrates a server-manifest subroutine for maintaining a server manifest for remote devices to select an appropriate proximity-detecting server, such as may be performed by a proximity-detecting server in accordance with one embodiment.

FIG. 6 illustrates a server-manifest subroutine 600 for maintaining a server manifest for remote devices to select an appropriate proximity-detecting server, such as may be performed by a proximity-detecting server 700 in accordance with one embodiment.

In block 605, server-manifest subroutine 600 obtains a server manifest. Typically, the server manifest was originally obtained from a remote request-routing server. As discussed above, a typical server manifest includes a list of proximity-detecting servers and their respective weighted geographic purviews. In various embodiments, the server manifest may include various statistical measures related to each server's weighted geographic purview, including statistical measures similar to some or all of the following: longitude, latitude, variance, weight.

In block 610, server-manifest subroutine 600 identifies one or more remote client devices that have recently provided digital audio signals to the proximity-detecting server that is performing server-manifest subroutine 600 (e.g., proximity-detecting server 700).

Beginning in opening loop block 615, server-manifest subroutine 600 processes each remote client device in turn, determining in block 620 a gross geolocation estimate corresponding to the current remote client device. In ending loop block 625, server-manifest subroutine 600 iterates back to opening loop block 615 to process the next remote client device, if any.

Once each remote client device has been processed, server-manifest subroutine 600 determines in decision block 630 whether a count of the current remote client devices exceeds a predetermined threshold. If so, server-manifest subroutine 600 proceeds to block 635; otherwise, server-manifest subroutine 600 proceeds to block 640.

In block 635, server-manifest subroutine 600 activates a new instance of the proximity-detecting server. Activating such a new instance is discussed above in relation to updating the purview of a proximity-detecting server in connection with request-routing server 110 (see FIG. 1, discussed above).

In block 640, server-manifest subroutine 600 updates one or more statistical measures. Based at least in part on the gross geolocation estimates determined in block 620. For example, in one embodiment, server-manifest subroutine 600 may update a mean statistical measure and a variance statistical measure to match the sample mean and variance of the clients attached to it.

In block 645, server-manifest subroutine 600 updates the server manifest according to the updated statistical measures. In some embodiments, updating the server manifest may include reporting a count of remote client devices to a remote request-routing server and receiving a re-weighted server manifest from the request-routing server.

Server-manifest subroutine 600 ends in ending block 699, returning to the caller.

Figure 7:
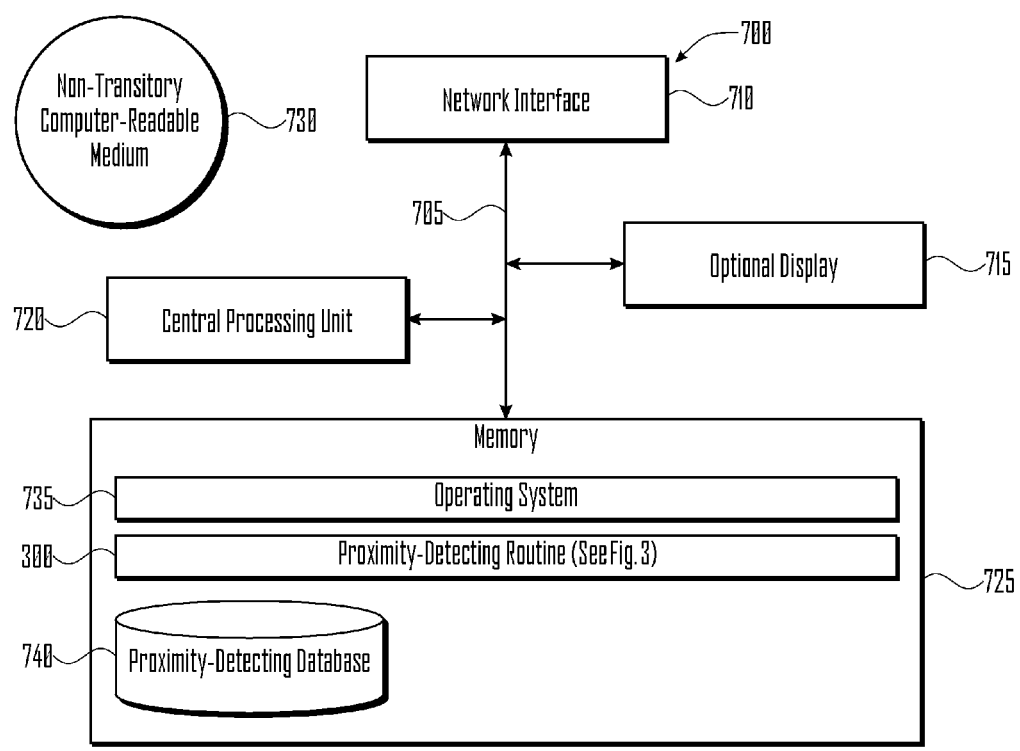
FIG. 7 illustrates several components of an exemplary proximity-detecting server in accordance with one embodiment.

FIG. 7 illustrates several components of an exemplary proximity-detecting server in accordance with one embodiment. In various embodiments, proximity-detecting server 700 may include a desktop PC, server, workstation, mobile phone, laptop, tablet, set-top box, appliance, or other computing device that is capable of performing operations such as those described herein. In some embodiments, proximity-detecting server 700 may include many more components than those shown in FIG. 7. However, it is not necessary that all of these generally conventional components be shown in order to disclose an illustrative embodiment.

In various embodiments, proximity-detecting server 700 may comprise one or more physical and/or logical devices that collectively provide the functionalities described herein. In some embodiments, proximity-detecting server 700 may comprise one or more replicated and/or distributed physical or logical devices.

In some embodiments, proximity-detecting server 700 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Proximity-detecting server 700 includes a bus 705 interconnecting several components including a network interface 710, an optional display 715, a central processing unit 720, and a memory 725.

Memory 725 generally comprises a random access memory ("RAM") and permanent non-transitory mass storage device, such as a hard disk drive or solid-state drive. Memory 725 stores program code for a proximity-detecting routine 300 for determining that remote devices share an acoustic environment without the need for any of the remote devices to specifically emit an identifiable audio signal (see FIG. 3, discussed above). In addition, the memory 725 also stores an operating system 735.

These and other software components may be loaded into memory 725 of proximity-detecting server 700 using a drive mechanism (not shown) associated with a non-transitory computer-readable medium 730, such as a floppy disc, tape, DVD/CD-ROM drive, memory card, or the like.

Memory 725 also includes proximity-detecting database 740. In some embodiments, proximity-detecting server 700 may communicate with proximity-detecting database 740 via network interface 710, a storage area network ("SAN"), a high-speed serial bus, and/or via the other suitable communication technology.

In some embodiments, proximity-detecting database 740 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Although specific embodiments have been illustrated and described herein, it will be appreciated by those of ordinary skill in the art that alternate and/or equivalent implementations may be substituted for the specific embodiments shown and described without departing from the scope of the present disclosure. For example, in other embodiment, similar techniques may be employed to determine proximity based on ambient signals other than audio signals (e.g., signals such as identifiers associated with nearby Wireless networks, wireless devices, cell towers, and the like).

In such other embodiment devices may supply timestamped signatures from ambient signals such as the SSID of WiFi access points and the MAC address of Bluetooth devices that are within range. As with AudioSignal/s, the service computes the similarity between these signatures and applies a clustering algorithm to identify devices that are in proximity to one another.

To quantify the similarity between two sets of WiFi SSIDs, one can use, for example, the TFIDF score or the Hamming distance between these sets. Similar measures can be used to quantify the similarity between sets of Bluetooth MAC addresses.

To fuse similarity information between different ambient signals, a clustering algorithm may be run on a weighted sum of the two or more similarity matrices. The weights in this sum are determined in an offline procedure that maximizes the precision and recall of the grouping. This application is intended to cover any adaptations or variations of the embodiments discussed herein.

The invention claimed is:

1. A computer-implemented method for determining that remote devices share an acoustic environment without the need for any of the remote devices to specifically emit an identifiable audio signal, the method comprising:
   obtaining, by the computer, a first digital audio signal representing a first incidental-ambient soundscape that is incidental to a first acoustic environment, as sampled during a first time period by a first remote device;
   analyzing, by the computer, said first digital audio signal to identify a portion of said first digital audio signal that includes a non-predetermined plurality of salient frequency components across a first plurality of time windows;
   determining, by the computer based at least in part on said non-predetermined plurality of salient frequency components and said first plurality of time windows, an incidental-audio signature specific to said first incidental-ambient soundscape and said first time period;
   obtaining, by the computer, a second digital audio signal representing a second incidental-ambient soundscape that is incidental to a second acoustic environment, as sampled during a second time period by a second remote device, wherein at least a portion of said second time period overlaps said first time period;
   identifying, by the computer, a temporal portion of said second digital audio signal that matches said incidental-audio signature more closely than other temporal portions of said second digital audio signal;
   determining, by the computer, a similarity measure comparing said temporal portion of said second digital audio signal with said incidental-audio signature;
   when said similarity measure exceeds a threshold, identifying, by the computer, an acoustic link between said first acoustic environment and said second acoustic environment; and consequently
   facilitating, by the computer, said first remote device and said second remote device to access a shared computing resource.

2. The method of claim 1, wherein analyzing said first digital audio signal to identify said identified portion of said first digital audio signal comprises:
   segmenting said first digital audio signal into a plurality of time-window segments; and
   selecting a subset of said plurality of time-window segments as including a plurality of frequency components whose energies vary highly within said subset of said plurality of time-window segments.

3. The method of claim 1, wherein analyzing said first digital audio signal to identify said identified portion of said first digital audio signal comprises:
   segmenting said first digital audio signal into a plurality of time-window segments; and
   selecting a subset of said plurality of time-window segments as having amplitudes that vary highly within said subset of said plurality of time-window segments.

4. The method of claim 1, wherein analyzing said first digital audio signal to identify said identified portion of said first digital audio signal comprises:
   determining a background-noise frequency and/or amplitude characteristic of said first digital audio signal; and
   selecting a subset of a plurality of time-window segments as differing from said background-noise frequency and/or amplitude characteristic.

5. The method of claim 1, wherein analyzing said first digital audio signal to identify said identified portion of said first digital audio signal comprises filtering said first digital audio signal to enhance frequency components within a human-voice-perception frequency-band and/or to diminish frequency components outside said human-voice-perception frequency-band.

6. The method of claim 1, further comprising in response to obtaining said first digital audio signal and said second digital audio signal, respectively providing a server manifest to said first remote device and said second remote device, said server manifest identifying a plurality of computers that provide proximity-detecting services, including the computer, and a respective plurality of weighted geographic purviews of said plurality of computers.

7. The method of claim 6, further comprising:
   determining a plurality of gross geolocation estimates corresponding respectively to a plurality of remote devices that are currently providing or have recently provided digital audio signals to the computer;
   determining a plurality of statistical measures based on said plurality of gross geolocation estimates; and
   updating said server manifest based at least in part on said plurality of statistical measures.

8. The method of claim 7, further comprising:
   determining a count of said plurality of remote devices;
   reporting said count to a request-routing server; and
   receiving a re-weighted server manifest from said request-routing server.

9. The method of claim 7, further comprising:
   determining a count of said plurality of remote devices; and
   when said count exceeds a predetermined threshold, activating a new instance of the computer.

10. A computing apparatus for determining that remote devices share an acoustic environment without the need for any of the remote devices to specifically emit an identifiable audio signal, the apparatus comprising a processor and a memory storing instructions that, when executed by the processor, configure the apparatus to:
    obtain a first digital audio signal representing a first incidental-ambient soundscape that is incidental to a first acoustic environment, as sampled during a first time period by a first remote device;
    analyze said first digital audio signal to identify a portion of said first digital audio signal that includes a non-predetermined plurality of salient frequency components across a first plurality of time windows;
    determine, based at least in part on said non-predetermined plurality of salient frequency components and said first plurality of time windows, an incidental-audio signature specific to said first incidental-ambient soundscape and said first time period;
    obtain a second digital audio signal representing a second incidental-ambient soundscape that is incidental to a second acoustic environment, as sampled during a second time period by a second remote device, wherein at least a portion of said second time period overlaps said first time period;
    identify a temporal portion of said second digital audio signal that matches said incidental-audio signature more closely than other temporal portions of said second digital audio signal;
    determine a similarity measure comparing said temporal portion of said second digital audio signal with said incidental-audio signature;
    when said similarity measure exceeds a threshold, identify an acoustic link between said first acoustic environment and said second acoustic environment; and consequently facilitate said first remote device and said second remote device to access a shared computing resource.

11. The apparatus of claim 10, wherein the instructions that configure the apparatus to analyze said first digital audio signal to identify said identified portion of said first digital audio signal further comprise instructions configuring the apparatus to:
segment said first digital audio signal into a plurality of time-window segments; and
select a subset of said plurality of time-window segments as including a plurality of frequency components whose energies vary highly within said subset of said plurality of time-window segments.

12. The apparatus of claim 10, wherein the instructions that configure the apparatus to analyze said first digital audio signal to identify said identified portion of said first digital audio signal further comprise instructions configuring the apparatus to:
segment said first digital audio signal into a plurality of time-window segments; and
select a subset of said plurality of time-window segments as having amplitudes that vary highly within said subset of said plurality of time-window segments.

13. The apparatus of claim 10, wherein the instructions that configure the apparatus to analyze said first digital audio signal to identify said identified portion of said first digital audio signal further comprise instructions configuring the apparatus to:
determine a background-noise frequency and/or amplitude characteristic of said first digital audio signal; and
select a subset of a plurality of time-window segments as differing from said background-noise frequency and/or amplitude characteristic.

14. The apparatus of claim 10, wherein the instructions that configure the apparatus to analyze said first digital audio signal to identify said identified portion of said first digital audio signal further comprise instructions configuring the apparatus to filter said first digital audio signal to enhance frequency components within a human-voice-perception frequency-band and/or to diminish frequency components outside said human-voice-perception frequency-band.

15. The apparatus of claim 10, wherein the memory stores further instructions that further configure the apparatus to in response to obtaining said first digital audio signal and said second digital audio signal, respectively provide a server manifest to said first remote device and said second remote device, said server manifest identifying a plurality of computers that provide proximity-detecting services, including the computing apparatus, and a respective plurality of weighted geographic purviews of said plurality of computers.

16. A non-transitory computer-readable storage medium having stored thereon instructions including instructions that, when executed by a processor, configure the processor to:
obtain a first digital audio signal representing a first incidental-ambient soundscape that is incidental to a first acoustic environment, as sampled during a first time period by a first remote device;
analyze said first digital audio signal to identify a portion of said first digital audio signal that includes a non-predetermined plurality of salient frequency components across a first plurality of time windows;
determine, based at least in part on said non-predetermined plurality of salient frequency components and said first plurality of time windows, an incidental-audio signature specific to said first incidental-ambient soundscape and said first time period;
obtain a second digital audio signal representing a second incidental-ambient soundscape that is incidental to a second acoustic environment, as sampled during a second time period by a second remote device, wherein at least a portion of said second time period overlaps said first time period;
identify a temporal portion of said second digital audio signal that matches said incidental-audio signature more closely than other temporal portions of said second digital audio signal;
determine a similarity measure comparing said temporal portion of said second digital audio signal with said incidental-audio signature;
when said similarity measure exceeds a threshold, identify an acoustic link between said first acoustic environment and said second acoustic environment; and
consequently facilitate said first remote device and said second remote device to access a shared computing resource.

17. The non-transitory computer-readable storage medium of claim 16, wherein the instructions that configure the processor to analyze said first digital audio signal to identify said identified portion of said first digital audio signal further comprise instructions configuring the processor to:
segment said first digital audio signal into a plurality of time-window segments; and
select a subset of said plurality of time-window segments as including a plurality of frequency components whose energies vary highly within said subset of said plurality of time-window segments.

18. The non-transitory computer-readable storage medium of claim 16, wherein the instructions that configure the processor to analyze said first digital audio signal to identify said identified portion of said first digital audio signal further comprise instructions configuring the processor to:
segment said first digital audio signal into a plurality of time-window segments; and
select a subset of said plurality of time-window segments as having amplitudes that vary highly within said subset of said plurality of time-window segments.

19. The non-transitory computer-readable storage medium of claim 16, wherein the instructions that configure the processor to analyze said first digital audio signal to identify said identified portion of said first digital audio signal further comprise instructions configuring the processor to:
determine a background-noise frequency and/or amplitude characteristic of said first digital audio signal; and
select a subset of a plurality of time-window segments as differing from said background-noise frequency and/or amplitude characteristic.

20. The non-transitory computer-readable storage medium of claim 16, wherein the instructions that configure the processor to analyze said first digital audio signal to identify said identified portion of said first digital audio signal further comprise instructions configuring the processor to filter said first digital audio signal to enhance frequency components within a human-voice-perception frequency-band and/or to diminish frequency components outside said human-voice-perception frequency-band.

21. The non-transitory computer-readable storage medium of claim 16, having stored thereon further instructions that further configure the processor to in response to obtaining said first digital audio signal and said second digital audio signal, respectively provide a server manifest to said first remote device and said second remote device, said server manifest identifying a plurality of computers that provide proximity-detecting services, including the processor, and a respective plurality of weighted geographic purviews of said plurality of computers.

* * * * *